(12) United States Patent
Dahal et al.

(10) Patent No.: US 12,122,707 B2
(45) Date of Patent: Oct. 22, 2024

(54) COATED GLASS ARTICLES

(71) Applicant: PILKINGTON GROUP LIMITED, Lathom (GB)

(72) Inventors: Lila Raj Dahal, Perrysburg, OH (US); Vikash Ranjan, Perrysburg, OH (US); Srikanth Varanasi, Ottawa Hills, OH (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 17/800,241

(22) PCT Filed: Feb. 18, 2021

(86) PCT No.: PCT/GB2021/050397
§ 371 (c)(1),
(2) Date: Aug. 17, 2022

(87) PCT Pub. No.: WO2021/165680
PCT Pub. Date: Aug. 26, 2021

(65) Prior Publication Data
US 2023/0071762 A1  Mar. 9, 2023

Related U.S. Application Data

(60) Provisional application No. 62/978,883, filed on Feb. 20, 2020.

(51) Int. Cl.
C03C 17/36 (2006.01)
C03C 17/34 (2006.01)
G02B 1/116 (2015.01)

(52) U.S. Cl.
CPC ........ *C03C 17/366* (2013.01); *C03C 17/3417* (2013.01); *C03C 17/3681* (2013.01);
(Continued)

(58) Field of Classification Search
CPC .............. C03C 17/366; C03C 17/3681; C03C 2217/94–948; C03C 17/3417; G02B 1/116
See application file for complete search history.

(56) References Cited

U.S. PATENT DOCUMENTS

| | | |
|---|---|---|
| 4,187,336 A | 2/1980 | Gordon |
| 4,206,252 A | 6/1980 | Gordon |

(Continued)

FOREIGN PATENT DOCUMENTS

| | | | | |
|---|---|---|---|---|
| CN | 103539365 A | | 1/2014 | |
| EP | 1230188 B1 | * | 9/2003 | ......... C03C 17/2453 |

(Continued)

OTHER PUBLICATIONS

European Patent Office, International Search Report with Written Opinion, dated May 12, 2021, 9 pages, European Patent Office, Rijswijk, Netherlands.

*Primary Examiner* — Z. Jim Yang
(74) *Attorney, Agent, or Firm* — Marshall & Melhorn, LLC

(57) ABSTRACT

A coated glass article provides a visible light reflecting, solar control glazing with a low emittance, a low solar heat gain coefficient, and a low shading coefficient that can significantly improve energy costs in buildings and homes while providing a desirable neutral color for, at least, film side reflection. The low emittance characteristic of the 5 glazing would minimize any indirect heat gain from absorption.

20 Claims, 1 Drawing Sheet

(52) U.S. Cl.
CPC .. *C03C 2217/244* (2013.01); *C03C 2217/734* (2013.01); *C03C 2217/94* (2013.01); *C03C 2218/152* (2013.01); *G02B 1/116* (2013.01)

(56) References Cited

U.S. PATENT DOCUMENTS

| | | | | |
|---|---|---|---|---|
| 4,419,386 | A * | 12/1983 | Gordon | C03C 17/3411 427/166 |
| 4,716,086 | A * | 12/1987 | Gillery | G02B 5/208 204/192.27 |
| 5,362,552 | A * | 11/1994 | Austin | C03C 17/3417 359/359 |
| 5,698,262 | A | 12/1997 | Soubeyrand et al. | |
| 5,773,086 | A | 6/1998 | McCurdy et al. | |
| 6,124,026 | A * | 9/2000 | McCurdy | G02B 1/113 359/359 |
| 6,238,738 | B1 | 5/2001 | McCurdy | |
| 6,423,414 | B1 * | 7/2002 | Legrand | C03C 17/3681 428/426 |
| 6,436,541 | B1 * | 8/2002 | Sopko | G02B 1/116 359/359 |
| 6,733,889 | B2 | 5/2004 | Varanasi et al. | |
| 6,797,388 | B1 * | 9/2004 | Szanyi | C03C 17/3681 428/428 |
| 6,838,178 | B1 * | 1/2005 | Strickler | G02B 1/116 359/359 |
| 6,858,306 | B1 * | 2/2005 | Strickler | C03C 17/3447 359/359 |
| 2003/0113550 | A1 * | 6/2003 | Millett | A47F 3/0434 428/689 |
| 2003/0152781 | A1 * | 8/2003 | Russo | C03C 17/366 428/432 |
| 2003/0215648 | A1 * | 11/2003 | Varanasi | C03C 17/3417 428/432 |
| 2006/0141265 | A1 * | 6/2006 | Russo | C23C 18/1225 428/432 |
| 2007/0190339 | A1 * | 8/2007 | Tixhon | C03C 17/3681 428/432 |
| 2008/0070045 | A1 * | 3/2008 | Barton | C03C 17/36 428/411.1 |
| 2009/0117371 | A1 * | 5/2009 | Glaeser | C03C 17/3435 427/595 |
| 2012/0164420 | A1 * | 6/2012 | Lemmer | E06B 3/66 156/99 |
| 2013/0095292 | A1 * | 4/2013 | Pfaff | C03C 17/23 428/142 |
| 2014/0004283 | A1 * | 1/2014 | Bouesnard | B32B 17/06 428/34 |
| 2014/0063582 | A1 * | 3/2014 | Gross | E06B 3/00 359/359 |
| 2015/0329407 | A1 * | 11/2015 | Horsley | C03C 4/02 501/71 |
| 2016/0002098 | A1 * | 1/2016 | Sternchuss | B32B 17/10761 65/60.2 |
| 2017/0146709 | A1 * | 5/2017 | O'Ryan | G02B 5/208 |
| 2020/0131084 | A1 * | 4/2020 | Myli | C03C 17/3681 |
| 2020/0148587 | A1 * | 5/2020 | Burrows | C03C 17/3417 |

FOREIGN PATENT DOCUMENTS

| | | | | |
|---|---|---|---|---|
| EP | 1169275 | B1 * | 6/2012 | C03C 17/34 |
| EP | 3431456 | A1 | 1/2019 | |
| WO | WO-2008142208 | A1 * | 11/2008 | C03C 17/06 |
| WO | WO 2016/208444 | A1 | 12/2016 | |

* cited by examiner

COATED GLASS ARTICLES

BACKGROUND OF THE INVENTION

The invention relates to coated glass and, in particular, to visible light reflecting, solar control coated glass articles.

Coatings on architectural glass are commonly utilized to provide specific energy absorption and light transmittance properties. Additionally, coatings provide desired reflective or spectral properties that are aesthetically pleasing. The coated articles are often used singularly or in combination with other coated articles to form a glazing or window unit.

The attributes of the resulting coated glass substrate are dependent upon the specific coatings applied during the float glass process or an off-line sputtering process. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

SUMMARY OF THE INVENTION

According to a first aspect the present invention provides a coated glass article comprising:
a) a glass substrate;
b) a first coating deposited over the glass substrate, the first coating comprising an absorbing layer;
b) a second coating deposited over the first coating, the second coating comprising a low emissivity layer and having a first refractive index; and
c) a third coating deposited over the second coating, the third coating comprising a reflecting layer and having a second refractive index greater than the first refractive index of the first coating;
the coated glass article having an Rf>15% and an emissivity less than or equal to about 0.3.

Thus the invention provides a visible light reflecting, solar control article comprising a glass substrate, a first coating deposited over the glass substrate, a second coating deposited over the first coating, and a third coating deposited over the second coating.

It should be noted that the refractive index values described herein are reported as an average value across 400-780 nm of the electromagnetic spectrum.

The first coating is comprised of an absorbing layer, and is preferably comprised of antimony doped tin oxide.

The second coating is preferably comprised of a doped metal oxide, and in an especially preferred embodiment is comprised of fluorine doped tin oxide. The second coating provides the low emissivity of the coated glass article, and preferably has a refractive index that is higher than the refractive index of the first coating.

The third coating is preferably comprised of a transparent metal oxide having a refractive index greater than the refractive index of the second coating. The addition of the third coating increases the visible light reflectance of the coated glass article, so that the resulting coated glass article has a film side reflectance Rf>15% and an emissivity less than or equal to about 0.3.

Preferably, the coated glass article includes an iridescence-suppressing interlayer deposited between the glass substrate and the first coating of the doped metal oxide. The coatings are such as to provide a neutral color in transmittance and reflectance when applied to a clear glass substrate.

The coated glass article of the invention is a visible light reflecting, solar control glazing with a low emittance, a low solar heat gain coefficient, and a low shading coefficient that can significantly improve energy costs in buildings and homes while providing a desirable neutral color for, at least, film side reflection. The low emittance characteristic of the glazing would minimize any indirect heat gain from absorption.

DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

Figure 1:
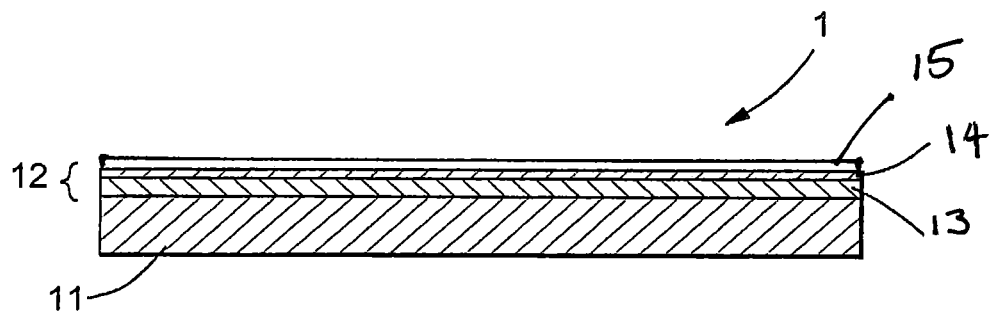
FIG. 1 is a sectional view through a coated glass article in accordance with one embodiment of the invention.

Referring to FIG. 1, a visible light reflecting, solar control coated glass article 1 comprises a glass substrate 11 and a multi-layer coating 12 including an absorbing layer 13, a low emissivity layer 14 and a reflecting layer 15.

Figure 2:
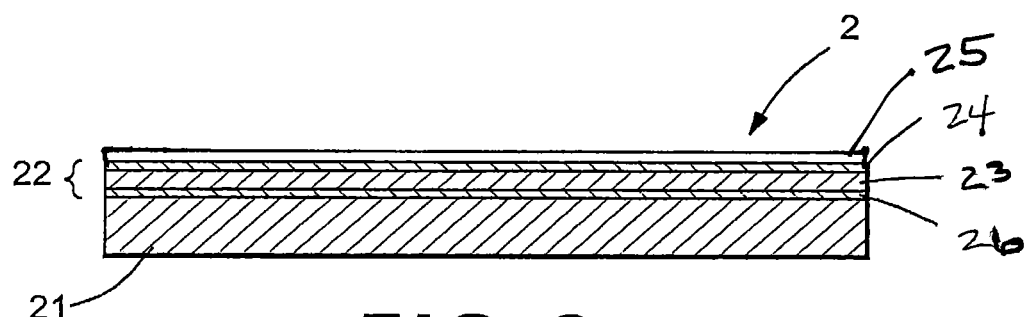
FIG. 2 is a sectional view through a coated glass article in accordance with a second preferred embodiment of the invention.

The embodiment shown in FIG. 2 is similar to the embodiment of FIG. 1, with a coated glass article 2 comprising a glass substrate 21 and a multi-layer coating 22. However, coating 22 differs from coating 12 in that it comprises, in addition to absorbing layer 23, low emissivity layer 24 and reflecting layer 25, an iridescence suppressing underlayer 26 as further discussed hereinafter.

Figure 3:
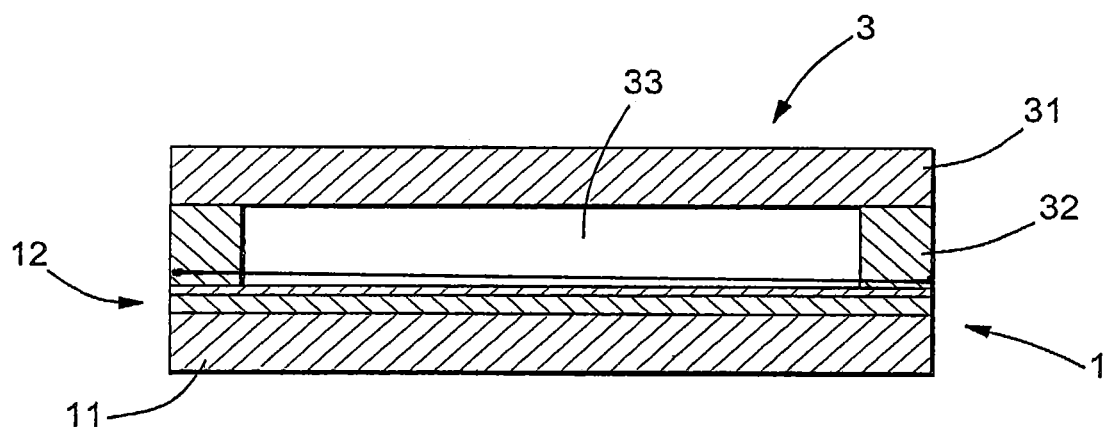
FIG. 3 is sectional view through a double glazing unit incorporating a coated glass article as illustrated in FIG. 1.

FIG. 3 illustrates the coated glass pane 1 of FIG. 1 assembled in parallel spaced apart relationship with a second pane of glazing material 31, typically of clear float glass, the panes being spaced apart and sealed together by spacing and sealing system 32, to form double glazing unit 3 having airspace 33. The coating 12 faces the airspace 33 of the unit, with the coating facing towards the interior of the glazed space (usually, but not necessarily, a building). The second pane of glazing material 31 may, in certain preferred embodiments, be provided with a low emissivity layer (not shown) facing towards the airspace 33.

The glass substrates suitable for use in preparing the coated glass article according to the present invention may include any of the conventional glass compositions known in the art as useful for the preparation of architectural glazings. The preferred substrate is a tinted float glass ribbon wherein the coatings of the present invention are applied in the heated zone of the float glass process. Additionally, clear glass substrates may be suitable for applying the multilayered stack of the invention. However, the tinted glass substrates may be especially preferred for their impact on the spectral and energy transmittance properties of the coated glass article.

The absorbing layer, in the context of the invention, is a layer that provides measurable absorption within the solar energy spectrum, including but not limited to the visible part of the spectrum. The absorbing layer preferably comprises tin oxide containing a dopant selected from antimony, tungsten, vanadium, iron, chromium, molybdenum, niobium, cobalt, nickel and mixtures thereof, iron oxide, molybdenum oxide, or silicon. The absorbing layer is most preferably comprised of antimony doped tin oxide. The amount of antimony present in the film is preferably about 3 to 10 atomic percent. Lower levels of antimony in the film layer can result in the layer not being sufficiently absorbing for the intended use. The preferred absorbing layer of antimony doped tin oxide coating is relatively selective, absorbing more near infrared energy than visible light. The antimony doped oxide coating thus reduces the total solar energy transmittance of the coated glass article of the invention.

The low emissivity layer is a layer of a metal compound, normally a metal oxide (as other low emissivity compounds such as metal nitrides and metal silicides tend to be difficult to make), and a transparent semiconductor, for example, a doped indium, tin or zinc oxide. Preferred materials include tin doped indium oxide and fluorine doped tin oxide, with fluorine doped tin oxide being especially preferred. The low emissivity layer has a refractive index that is higher than the refractive index of the absorbing layer. The low emissivity layer will normally have a thickness in the range 1,000 Å to 5,000 Å, especially a thickness in the range 2,000 Å to 4,000 Å. The low emissivity layer provides an emissivity of less than 0.3 (the numerical values of emissivity referred to in this description and the accompanying claims are values of hemispherical emissivity (Eh)), although it is preferred to use a low emissivity layer which provides an emissivity of 0.22 or less.

The reflecting layer is deposited over the low emissivity layer in the coated glass article of the invention. The reflecting layer has a refractive index in the visible spectrum that is greater than the refractive index of the low emissivity layer. The refractive index of the reflecting layer will generally be greater than or equal to about 2.0, and preferably will in the range of 2.2 to 2.6. The reflecting layer is normally a layer of a transparent metal oxide, such as oxides of titanium, niobium or chromium. An oxide of titanium is an especially preferred material for forming the reflecting layer of the coated glass article of the invention.

Titanium oxide coatings formed by atmospheric pressure chemical vapor deposition, such as those described in U.S. Pat. No. 6,238,738, which is incorporated herein by reference, are known to be photocatalytic and hydrophilic. Thus, use of the coating stack of the invention on an exterior-facing surface of a glazing will result in so-called "self-cleaning" properties. Of course, use of the coating stack of the invention on the exterior-facing surface of an insulated glass unit will negatively impact the solar control properties relative to use of the same coating stack on an unexposed surface of a pane of an insulating glass unit.

Use of thin films, as in the present invention, may result in the appearance of interference colors and iridescence. To avoid, or at least alleviate, undesirable color resulting from interference effects, a color suppressing underlayer (which may itself be a combination of sub-layers) may be applied to the glass prior to deposition of the low emissivity and reflecting layers. Iridescence-suppressing coatings are conventionally known within the art. For example, U.S. Pat. Nos. 4,187,336; 4,419,386; and 4,206,252, herein incorporated by reference, describe coating techniques suitable for suppressing interference colors. The interlayer of the present invention may comprise a single iridescence-suppressing coating, a two-layer coating, or a gradient coating. Thus, according to a preferred aspect of the invention, an iridescence suppressing layer or layers is incorporated under the coating comprising a low emissivity layer and reflecting layer.

The absorbing layer, low emissivity layer and reflecting layer of the present invention may be deposited by known techniques, for example, by sputtering, including reactive sputtering, or by chemical vapor deposition. Indeed, it is an important advantage of the invention that each of the above layers is susceptible to deposition by chemical vapor deposition techniques providing for the possibility of applying the coating to the hot ribbon of glass during the glass production process. Methods of depositing metal oxides by chemical vapor deposition are described, for example, in U.S. Pat. Nos. 5,698,262; 5,773,086 and 6,238,738, each of which is incorporated by reference herein.

The invention is illustrated but not limited by the following Examples. In the Examples, as in the remainder of the description and claims, Tvis represents the visible light transmission measured using Illuminant C on a Perkin-Elmer Lambda 19 spectrophotometer. The total solar heat transmissions (Tsol) stated are determined by weighting with a solar spectral irradiance function (ASTM E891-87) that represents the direct normal radiation incident on a surface (air mass 1.5). The Rg and Rf are the total visible light reflectances measured from the glass and film sides respectively. These reflectances were measured using a Colorsphere spectrophotometer available from BYK Gardner Scientific. SHGC is the solar heat gain coefficient, SC is the shading coefficient and Rsh is the sheet resistance in ohms per square. The color of light transmitted and reflected from the film side of the coated glass articles is measured according to the CIELAB color scale coordinates of a* and b*.

EXAMPLES

The multi-layer coating stacks of the Examples were deposited by chemical vapor deposition on a float glass ribbon during the float glass production process. The glasses used in the examples are all commercially available from Pilkington North America, Inc. of Toledo, Ohio. The glass used in each of Examples 1-3 and Comparative Examples C1-C5 was 6 mm Arctic Blue™ glass, the glass used in Example 4 was 6 mm Evergreen™ glass, and the glass used in Example 5 was 6 mm Pilkington Optifloat™ Grey glass.

In each of Examples 1-5 and Comparative Examples C1-C5, an iridescence-suppressing interlayer was first deposited onto the surface of the glass substrate in the heated zone of a float glass production process. The iridescence-suppressing layer included a tin oxide coating deposited on and adhered to the glass substrate at thickness of 250 Å. The tin oxide was applied by chemical vapor deposition in the heated zone of the float glass process by introducing dimethyl tin dichloride in an oxidizing atmosphere over the surface of the substrate. A silicon dioxide coating was then applied onto the surface of the tin oxide coating by reacting silane, in the presence of oxygen and ethylene, near the surface of the substrate in the heated zone of the float process. The thickness of the silicon dioxide coating was 250 Å.

An antimony doped tin oxide coating was deposited onto the surface of the silicon dioxide coating. The antimony doped tin oxide coating was deposited by chemical vapor deposition in the heated zone of the float glass process by introducing dimethyl tin dichloride, oxygen, water and triphenylantimony (TPA) in ethyl acetate in an oxidizing atmosphere over the surface of the substrate. The flow of dimethyl tin dichloride flow to the coater was 38 lb./hr. in each case. Examples 1, 2, C2, and C3 had a TPA/EtOAc flow to the coater for the antimony tin oxide layer of 35 sccm (standard cubic centimeters per minute), while Examples 3, 4, C4 and C5 had a TPA/EtOAc flow to the coater for the antimony tin oxide layer of 45 sccm, and Example 5 had a TPA/EtOAc flow to the coater for the antimony tin oxide layer of 60 sccm.

A fluorine doped tin oxide coating was deposited onto the surface of the antimony tin oxide coating. The fluorine doped tin oxide coating was deposited by chemical vapor deposition in the heated zone of the float glass process by introducing dimethyl tin dichloride, water and hydrogen fluoride in an oxidizing atmosphere over the surface of the substrate. The flow of dimethyl tin dichloride flow to the coater was 32 lb./hr. and the flow of hydrogen fluoride to the coater was 7 slpm (standard liter per minute) in each case.

A titanium dioxide coating was deposited onto the surface of the fluorine doped tin oxide coating. The titanium dioxide coating was also deposited by chemical vapor deposition in the heated zone of the float glass process by introducing titanium tetrachloride and an organic oxygen source over the surface of the substrate, as described in U.S. Pat. No. 6,238,738. The flow of the titanium tetrachloride to the coater was 11 sccm in each case.

Various layers were omitted in the comparative examples. In Comparative Example C1, the antimony doped tin oxide layer was omitted. In Comparative Example C2, the titanium dioxide layer was omitted. In Comparative Examples C3 and C4, the fluorine doped tin oxide layer was omitted. In Comparative Example C5, the fluorine doped tin oxide layer was replaced by a silicon layer, with the flow of $SiH_4$ to the coater being 4 slpm.

The properties of the resulting coated glass articles are shown below in Table 1.

TABLE 1

| | | Transmission | | | Film side reflection | | | Glass side reflection | | | | |
|---|---|---|---|---|---|---|---|---|---|---|---|---|
| Ex. | Tvis (%) | a* (T) | b* (T) | Tsol (%) | Rf (%) | a* (Rf) | b* (Rf) | Rg (%) | a* (Rg) | b* (Rg) | Rsh (Ω/sq) | Emissivity |
| C1 | 39.7 | −8.46 | −6.03 | 22.73 | 26.4 | −4.14 | −4.15 | 11.7 | −8.43 | −7.56 | 21.01 | 0.226 |
| C2 | 39.1 | −10.6 | −10.5 | 19.33 | 5.87 | 0.22 | −2.03 | 5.37 | −1.27 | −3.22 | 11.90 | 0.160 |
| 1 | 31.4 | −9.63 | −6.41 | 15.66 | 18 | −1.12 | −0.87 | 6.72 | −2.22 | −4.74 | 11.12 | 0.156 |
| 2 | 31 | −8.47 | −7.97 | 15.57 | 19.6 | −5.58 | 2.81 | 7.23 | −4.47 | −2.07 | 12.99 | 0.168 |
| 3 | 26.4 | −9.07 | −7.25 | 13.23 | 18.5 | −3.01 | −1.9 | 6.39 | −3.04 | −4.58 | 12.09 | 0.159 |
| C3 | 30.6 | −8.96 | −13 | 16.5 | 24.8 | −2.11 | 10.58 | 8.79 | −9.21 | 1.87 | 127.04 | 0.466 |
| C4 | 26.1 | −8.3 | −14.6 | 14.7 | 25.8 | −2.79 | 11.74 | 8.2 | −9.96 | 2.24 | 219.86 | 0.551 |
| C5 | 28.3 | −11.2 | −10.9 | 15.4 | 19.5 | 3.79 | −4.79 | 7.13 | −0.43 | −6.66 | 418.61 | 0.548 |
| 4 | 28.8 | −11.25 | 2.16 | 12.6 | 23.6 | 0.75 | −1.87 | 8 | −5.26 | 0.7 | 13.28 | 0.167 |
| 5 | 16.51 | −2.16 | −6.11 | 13.65 | 23.32 | 4.79 | 6.16 | 5.67 | 0.28 | −1.1 | 17.03 | 0.198 |

The layer thicknesses in Angstroms, were measured via spectroscopic ellipsometry for Examples 2 and 3. Above the noted color suppression underlayer, Example 2 had an 1850 Å thick layer of antimony doped tin oxide, a 2400 Å thick layer of fluorine doped tin oxide, and a 500 Å thick layer of titanium dioxide, while Example 3 had a 1900 Å thick layer of antimony doped tin oxide, a 2300 Å thick layer of fluorine doped tin oxide, and a 500 Å thick layer of titanium dioxide.

Each of the coated glass articles of Table 1 was combined in an IG unit with a 6 mm sheet of clear glass and an air gap therebetween, for a total IG unit thickness of 1". The properties of the resulting IG units are shown in Table 2.

TABLE 2

| | Transmission | | | | Film side reflection | | | Glass side reflection | | | Window properties | | |
|---|---|---|---|---|---|---|---|---|---|---|---|---|---|
| Example | Tvis (%) | a* (T) | b* (T) | Tsol (%) | Rf (%) | a* (Rf) | b* (Rf) | Rg (%) | a* (Rg) | b* (Rg) | Winter U-value | SHGC | SC |
| C1 | 35.45 | −9.43 | −5.81 | 19.3 | 29 | −5.19 | −3.3 | 12.8 | −9.03 | −7.92 | 0.352 | 0.289 | 0.332 |
| C2 | 34.2 | −11.3 | −9.94 | 16.5 | 12.6 | −1.27 | −1.45 | 6.56 | −3.11 | −5.18 | 0.333 | 0.257 | 0.296 |
| 1 | 27.8 | −10.4 | −6.08 | 13.5 | 22.4 | −2.53 | −0.82 | 7.5 | −3.32 | −5.3 | 0.332 | 0.227 | 0.261 |
| 2 | 27.5 | −9.33 | −7.49 | 13.4 | 23.7 | −5.84 | 1.76 | 7.94 | −5.18 | −3.04 | 0.335 | 0.228 | 0.262 |
| 3 | 23.3 | −9.79 | −6.9 | 11.4 | 22.8 | −3.93 | −1.51 | 6.9 | −3.78 | −5.14 | 0.333 | 0.208 | 0.239 |
| C3 | 27 | −9.78 | −12.2 | 14 | 28.1 | −3.61 | 7.44 | 9.55 | −9.58 | −0.07 | 0.408 | 0.259 | 0.298 |
| C4 | 23 | −9.11 | −13.7 | 12.4 | 28.9 | −4.17 | 8.32 | 8.73 | −10.1 | 0.38 | 0.424 | 0.251 | 0.289 |
| C5 | 24.9 | −11.7 | −10.5 | 13 | 23.6 | 0.85 | −3.63 | 7.76 | −1.5 | −7.56 | 0.424 | 0.256 | 0.294 |
| 4 | 26 | −11.9 | 2.13 | 10.9 | 26.8 | −1.51 | −1.61 | 8.74 | −6.17 | 0.86 | 0.335 | 0.203 | 0.233 |
| 5 | 16.3 | −2.89 | −4.8 | 11.6 | 26.3 | 1.12 | 4.15 | 5.7 | 0.04 | −1.29 | 0.299 | 0.208 | 0.239 |

The coated glass articles of the invention have an emissivity less than or equal to about 0.3 and preferably less than or equal to about 0.22, an Rf of 15% or more, preferably 18% or more, and most preferably 20% or more, and a Tsol of 16% or less, preferably 14% or less. When combined in an IG unit, the resulting coated glass articles have an SC of 0.32 or less, preferably 0.30 or less, and most preferably 0.25 or less.

In accordance with the provisions of the patent statutes, the invention has been described in what is considered to represent its preferred embodiments. However, it should be noted that the invention can be practiced otherwise than as specifically illustrated and described without departing from its spirit or scope.

What is claimed:

1. A coated glass article comprising:
   a) a glass substrate comprised of a sheet of tinted glass;
   b) a first coating deposited over the glass substrate, the first coating comprising an absorbing layer of a doped tin oxide;
   c) a second coating deposited over and in direct contact with the first coating, the second coating comprising a low emissivity layer of a doped oxide of indium, tin or zinc and having a first refractive index;
   d) a third coating deposited over the second coating, the third coating comprising a reflecting layer and having a second refractive index greater than the first refractive index of the second coating; and
   e) a two-layer color suppression underlayer deposited between the glass substrate and the first coating;
   the coated glass article having an Rf>15%, an emissivity greater than 0.08 and less than or equal to about 0.3, and a Tvis of 17% or more and 31% or less.

2. The coated glass article of claim 1, wherein the coated glass article has a Tsol of greater than 0% and less than or equal to 16%.

3. The coated glass article of claim 1, wherein the coated glass article has a Tsol of greater than 0% and less than or equal to 14%.

4. The coated glass article of claim 1, wherein the coated glass article has a Rf>18%.

5. The coated glass article of claim 1, wherein the coated glass article has a Rf>20%.

6. The coated glass article of claim 1, wherein the emissivity of the coated glass article is less than or equal to about 0.22.

7. The coated glass article of claim 1, wherein the absorbing layer comprises an antimony doped metal oxide.

8. The coated glass article of claim 1, wherein the absorbing layer comprises an antimony doped tin oxide.

9. The coated glass article of claim 1, wherein the low emissivity layer comprises a fluorine doped tin oxide.

10. The coated glass article of claim 1, wherein the reflecting layer comprises an oxide of titanium.

11. The coated glass article of claim 1, wherein the coated glass article forms one of the panes of an insulated glazing unit.

12. The coated glass article of claim 11, wherein the first, second and third coatings of the coated glass article are deposited on a surface of the coated glass article that faces another pane of the insulating glass unit.

13. The coated glass article of claim 11, having a shading coefficient less than or equal to 0.32.

14. The coated glass article of claim 11, having a shading coefficient less than or equal to 0.30.

15. The coated glass article of claim 11, having a shading coefficient less than or equal to 0.25.

16. The coated glass article of claim 1, wherein the first, second and third coatings are formed pyrolytically.

17. The coated glass article of claim 1, wherein the first, second and third coatings are formed by chemical vapor deposition.

18. The coated glass article of claim 1, wherein two-layer color suppression underlayer comprises a first color suppression layer of an oxide of tin deposited over the glass substrate and a second color suppression layer of an oxide of silicon deposited over the first color suppression layer.

19. A coated glass article comprising:
a) a glass substrate;
b) a first coating deposited over the glass substrate, the first coating comprising an absorbing layer of a doped tin oxide;
c) a second coating deposited over and in direct contact with the first coating, the second coating comprising a low emissivity layer of a doped oxide of indium, tin or zinc and having a first refractive index;
d) a third coating deposited over the second coating, the third coating comprising a reflecting layer and having a second refractive index greater than the first refractive index of the second coating; and
e) a two-layer color suppression underlayer deposited between the glass substrate and the first coating;
wherein the coated glass article has an Rf>15%, an emissivity greater than 0.08 and less than or equal to about 0.3, a Tsol of greater than 0% and less than or equal to 16%, and a film side reflection b* of from −1.9 to +2.9.

20. A coated glass article comprising:
a) a glass substrate;
b) a first coating deposited over the glass substrate, the first coating comprising an absorbing layer of a doped tin oxide;
c) a second coating deposited over and in direct contact with the first coating, the second coating comprising a low emissivity layer of a doped oxide of indium, tin or zinc and having a first refractive index;
d) a third coating deposited over the second coating, the third coating comprising a reflecting layer and having a second refractive index greater than the first refractive index of the second coating; and
e) a two-layer color suppression underlayer deposited between the glass substrate and the first coating;
wherein the coated glass article has an Rf>15%, an emissivity greater than 0.08 and less than or equal to about 0.3, and a Tvis of 17% or more and 31% or less.

* * * * *